May 10, 1949.  M. L. McBRAYER  2,469,736
ELECTRONIC APPARATUS FOR DETERMINING
MOISTURE CONTENT IN MATERIALS
Filed Feb. 24, 1948  2 Sheets-Sheet 1
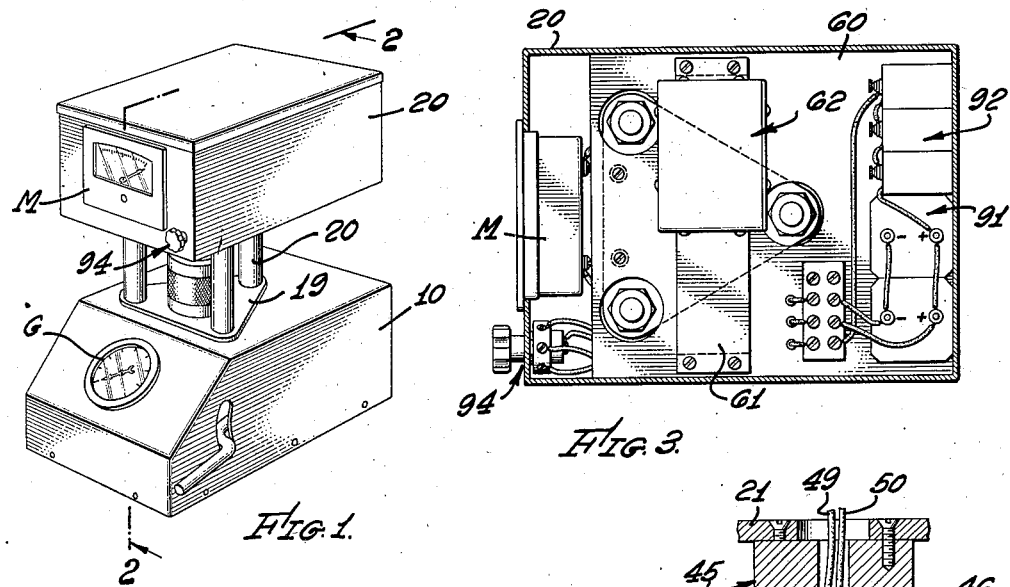
Fig. 1.
Fig. 3.
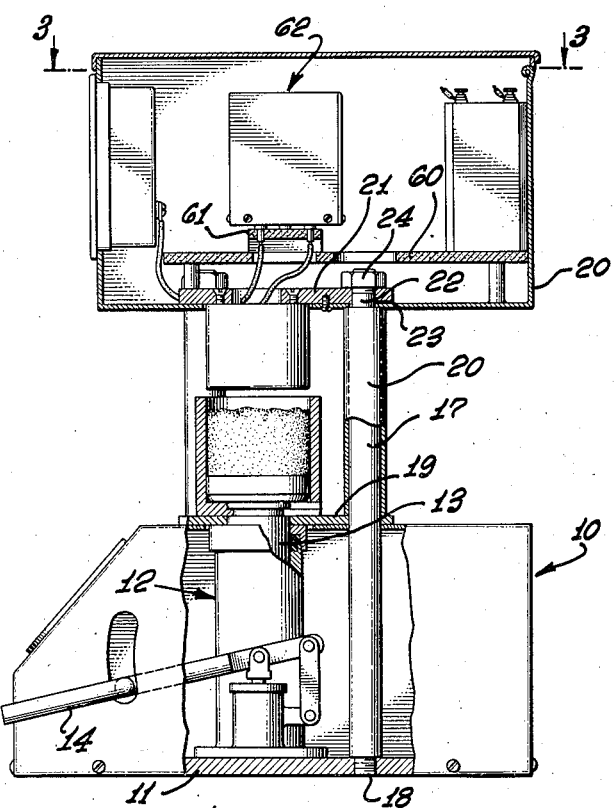
Fig. 2.
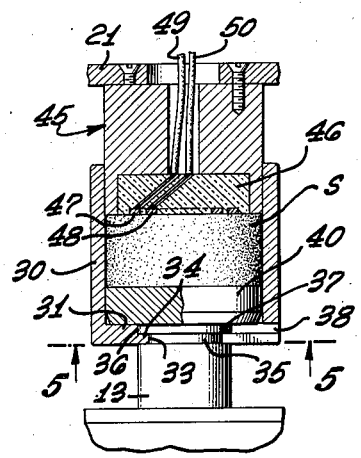
Fig. 4.
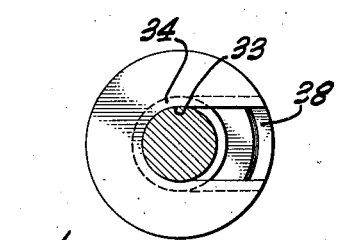
Fig. 5.
MARVIN L. McBRAYER,
INVENTOR.
BY
ATTORNEY.

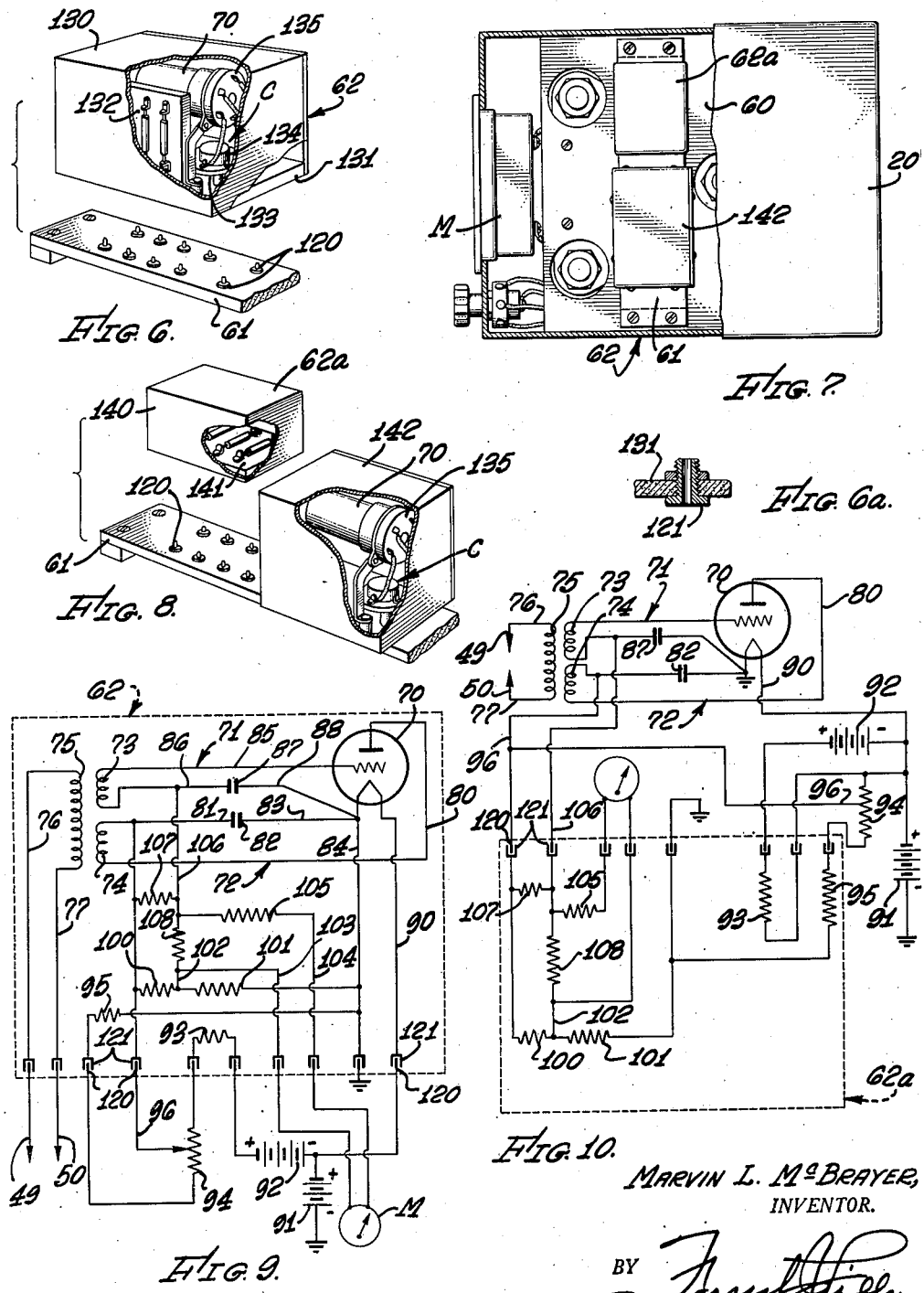

Patented May 10, 1949

2,469,736

UNITED STATES PATENT OFFICE 2,469,736

ELECTRONIC APPARATUS FOR DETERMINING MOISTURE CONTENT IN MATERIALS

Marvin L. McBrayer, Alhambra, Calif.

Application February 24, 1948, Serial No. 10,437

2 Claims. (Cl. 175—183)

1

This invention relates generally to electronic apparatus for measurement of moisture content in materials, and, in a particular illustrative embodiment, to such apparatus designed especially for granular, shredded, or powdered materials.

The invention may be regarded as an improvement in apparatus disclosed in Patent Number 2,343,340 to Robert L. Stevens, and in a preferred type of electronic circuit employed therein disclosed in Patent Number 2,231,035 to Robert L. Stevens and James P. Dallas.

Briefly, such apparatus employs a high frequency vacuum tube oscillator having an output circuit leading to output electrodes spaced by a gap for an electric field, and the material whose moisture content is to be measured is placed in this field. The constants of the oscillator are such that a microammeter in its grid circuit will give readings varying with the power absorbed by the material from the output circuit of the oscillator; and since the power absorption characteristics of materials vary with this moisture content, the microammeter readings indicate percentage of moisture content. Differing materials have widely differing power absorption characteristics; and it is necessary to adjust certain constants of the circuit at the time of manufacture of the instrument to match its sensitivity to the power loss characteristics of the material with which it is to be used. A given instrument is accordingly useful, ordinarily, only on a given material for which it has been standardized. It has therefore been necessary for those dealing with several materials of diverse characteristics to purchase one entire moisture testing instrument for each. Particularly in the case of instruments for use with granular materials, which usually involve hydraulic means for placing the material under compression while the moisture measurement is made, the expense of providing duplicate equipment for each of a large number of materials becomes very considerable.

It is accordingly a primary purpose of the present invention to provide a single moisture indicating instrument which is usable with a large variety of materials of diverse power loss characteristics by a simple conversion procedure.

The invention provides a moisture measuring apparatus having a quickly detachable and replaceable component containing range determining circuit elements of the oscillator. The instrument may be equipped with a number of these components, each designed to adjust the oscillator to the proper range for a given material, and these components may be instantly changed

2 at will, depending upon calls made from time to time upon the instrument.

The invention also provides certain improvements in granular moisture testing equipment, as will appear in the course of the ensuing description.

The invention will be understood from the following detailed description of present illustrative embodments thereof, reference being had to the accompanying drawings, in which:

Figure 1 is a perspective view of a moisture testing instrument in accordance with the invention;

Figure 2 is a vertical section taken in accordance with the plane 2—2 of Figure 1;

Figure 3 is a view taken in accordance with the line 3—3 of Figure 2;

Figure 4 is a vertical medial section through the material cup, electrode, and electrode holder, together with the upper end portion of the hydraulic plunger;

Figure 5 is a section taken on line 5—5 of Figure 4;

Figure 6 is a perspective view of the removable unit, shown in disassembled position with reference to its mounting panel;

Figure 6a is a fragmentary sectional view showing a connector socket used in the bottom of the removable component of the oscillator;

Figure 7 is a view similar to Figure 3, but showing a modification;

Figure 8 is a view of the mounting panel for the electronic unit, together with the removable range conversion unit shown in disassembled position; and Figures 9 and 10 show two forms of electric circuit arrangement in accordance with the invention.

In Figures 1 to 5 of the drawings, numeral 10 designates a lower or base housing, including heavy steel bottom or base plate 11, together with sheet metal sides and top, as indicated. Mounted directly on base plate 11 is a two-way hydraulic power unit or jack, designated generally by numeral 12, and which may be of any conventional type suitable to the purpose, this particular jack having plunger 13 adapted to be elevated by reciprocating jack handle 14, and the plunger being understood to be returnable by any conventional means, as a spring, provision for reverse pumping, etc. Since the internal construction of this jack forms no part of the present invention, and any suitable standard jack may be employed, no further description or illustration of the jack is deemed necessary to an understanding of the invention. It may be noted, however, that the top of the jack cylinder is flush with the top of the housing 10, and that the jack plunger 13 moves upwardly from the top of the housing to compress the material in the material cup, prior to making moisture measurements thereon. A pressure gage G adapted and connected to indicate the hydraulic pressure developed by this jack may be mounted in the front of housing 10, as indicated.

A plurality of heavy steel tie rods 17, here three in number, have reduced lower ends 18 threaded into base plate 11, and these tie rods extend upwardly above the top of housing 10 to support an instrument housing 20 in vertically spaced relation above housing 10, as shown. An approximately triangular, suitably apertured plate 19 is moved down over tie rods 17 to rest on the top of box 10, and chromium-plated tubes 20 are then placed on the tie rods, with their lower ends engaging the plate 19. The lower wall of housing 20, as well as a heavy plate 21 mounted inside said wall, are apertured to receive the reduced screwthreaded upper end portions 22 of tie rods 17, and rest downwardly on the tie rod shoulders 23, being held in place by nuts 24 all as clearly shown in Figure 2.

A cylindrical steel material cup 30 is mounted on the upper end portion of jack plunger 13. This cup 30 has a bottom wall 31 which is formed with a detachable connection with the upper end portion of plunger 13, as shown best in Figures 4 and 5. The bottom wall 31 has a central aperture 33 defined by a flange 34 which is engageable in annular groove 35 formed around plunger 13 near the upper end thereof. The wall 31 is counterbored, as at 36, to accommodate the full diameter of the upper end portion or head 37 of plunger 13. It will be evident that the flange 34 on the cup causes the cup to be secured against vertical movement in either direction with reference to the plunger. To permit assembly and disassembly of the cup in relation to the plunger, the apertures or bores 33 and 36 in the cup are afforded lateral slots through to the outside of the cup, as indicated at 38. It will be evident that the cup may be disassembled from the plunger by moving it toward the left, as viewed in either of Figures 4 or 5, or may be assembled by moving it in the opposite direction.

In the bottom of cup 30 is a steel closure disc 40, preferably removable for ease of cleansing. The sample of material to be tested will be undestood to be placed inside the material cup prior to assembling the latter with the jack plunger 13, and such material is indicated in the cup at s in Figure 4.

Secured as by screws 44 to the aforementioned heavy plate 21 is a steel, cylindrically shaped electrode holder 45, the latter being receivable with a very close sliding fit inside the cylindrical bore of the material cup 30. The lower end of this holder 45 is recessed to receive insulation electrode disc 46, in the lower face of which are mounted, in flush positions, two annularly spaced electrode rings 47 and 48. These rings 47 and 48 are separated by an insulation cap, and, being energized by a high frequency electric current, produce an electric field which extends downwardly into the material sample s below the lower face of the electrode disc 46. The electrode plates 47 and 48 are energized by means of conductors 49 and 50 lead downwardly through a central bore 51 in holder 45 and through suitable passageways in the disc 46 as indicated.

Mounted in housing 20, preferably at a short spacing above the bottom wall of said housing is an insulation platform 60, and mounted on and above said platform is an insulation panel 61. This panel 61 carries a quick detachable unit 62 which includes certain range determining components of the electronic circuit of the apparatus.

Reference is next directed to Figure 9 showning a preferred electric circuit employed in the apparatus. This circuit comprises a high frequency vacuum tube oscillator including oscillator tube 70 (typically a 1LE3), having grid and plate circuits 71 and 72 coupled by grid and plate circuit coils 73 and 74, respectively, to which is coupled coil 75 of an output circuit which includes leads 76 and 77, the latter energizing the aforementioned electrode members 47 and 48 via wires 49 and 50. Plate circuit 72 includes lead 80 connecting the plate of tube 70 to coil 74, lead 81 connecting coil 74 to by-pass condenser 82, and lead 83 connecting condenser 82 to filament ground lead 84.

Grid circuit 71 includes lead 85 connecting the grid to coil 73, lead 86 connecting coil 73 to by-pass condenser 87, and lead 88 connecting condenser 87 to ground filament lead 84. The positive terminal of the filament is connected by lead 90 to the positive terminal of A or filament battery 91, the negative terminal of which is grounded. Lead 90 is also connected to the negative terminal of 15 volt B battery 92, the positive terminal of which is connected through fixed limit resistor 93, adjustable voltage divider resistor 94, and fixed resistor 95 to the aforementioned ground lead 84. In laboratory apparatus, the A and B battery power supply may of course be replaced by a suitable power supply fed by commercial power mains. The variable tap of voltage divider resistor 94 is connected by lead 96 to plate circuit lead 81. The voltage applied to the plate of tube 70 is that between circuit lead 96 and ground, and is under the control of voltage divider 94.

Positive grid bias voltage for the tube 70 is obtained from plate battery 92 through a resistor network leading to a connection with the grid circuit lead 86. Thus, a resistor 100 is connected at one end to plate circuit lead 96, and at its other end to one end of resistor 101, the other end of which is connected to ground lead 84. A lead 102 is connected from a point between resistors 100 and 101, and this lead 102 goes to a microammeter lead 103 leading to microammeter M. The other microammeter lead 104 includes resistor 105, and connects to lead 106 leading to grid circuit lead 86. A resistor 107 is connected between leads 106 and 96, and a resistor 108 is shunted across meter leads 103 and 104.

Without setting any limitations on the invention, the various resistors may have approximate values as follows: Resistor 93, 2400 ohms; resistor 94, 3000 ohms; resistor 95, 10,000 ohms; resistor 100, 18,000 ohms; resistor 101, 1600 ohms; resistor 105, 680 ohms; resistor 108, 1300 ohms; resistor 107, one meg. The microammeter may have a resistance of 660 ohms.

In operation, the oscillator creates a high frequency oscillating field between the output electrodes 47 and 48, which field penetrates the material sample s in the material cup 30, it being understood that the material sample is under a predetermined compression by operation of the hydraulic jack. The material in this cup will absorb power from the electric field depending upon the amount of moisture present in the material. It is the characteristic of the oscillator disclosed herein that the current flow in the grid circuit as read or reflected by the microammeter M, falls materially with increasing power absorption from the oscillator, and therefore falls with increasing moisture content in the material on test. The reading of this microammeter accordingly is a measure of the percentage of moisture in the material.

Materials of various characteristics require electric fields of varying degrees of power and penetration. For some material requirements, a highly sensitive instrument is required, and for others, the sensitivity should be low. The circuit is capable of being balanced to almost any requirement by adjustment of the relative values of the previously mentioned fixed resistors 93, 95, 100, 101, 105, 107 and 108. If still further adjustment is required, the tube 70 and/or coils may be changed. The adjustment and balancing of these oscillator components is a factory operation, and once the circuit has been adjusted for a given material, it is useful only for that particular material. In accordance with the present invention, this network of resistors is placed within the quick detachable unit 62, mentioned hereinbefore. In the specific embodiment of Figures 1 to 5 and 9, the unit 62 includes also the vacuum tube and oscillator coils and condensers, although in a later described embodiment, only the resistor network is included within the removable unit. Referring again to Figure 9, the parts within the removable unit 62 are seen to be enclosed within the dotted rectangle designated by numeral 62, and the parts outside the said rectangle, which includes the meter M, batteries 91 and 92, voltage divider 94, and electrodes 47 and 48, are permanently mounted in the housing 20 separate of the unit 62. Detachable pin and socket connections, such as indicated at 120 and 121, are made in the various leads connecting the electric components within the unit 62 and the remaining components permanently mounted in or on the instrument housing 20.

Referring again to Figures 1 to 3, the meter M will be seen to be mounted in the front wall of housing 20, the voltage divider 94 to be also mounted in the front wall of housing 20, and the batteries 91 and 92 to be mounted on platform 60 to the rear of the housing 20. The removable unit 62 may comprise a sheet metal housing 130 comprising sides, ends and top, and an insulation bottom wall 131. Rising from the latter is an insulation panel 132 on which the various fixed resistors may be mounted. At one end, on an insulation platform 133, is mounted a coil assembly C understood to comprise the three coupled coils 73, 74 and 75, this assembly preferably being covered with an insulation compound as indicated at 134. Mounted above the coil assembly is the socket 135 for the aforementioned oscillator tube 70. The bottom wall 131 has mounted therein a plurality of the aforementioned socket units 121 (Figure 6a) for the coacting pin connectors 120 which are mounted on the panel 61.

Thus, the apparatus may be equipped with a plurality of the removable units 62, replaceable with one another at will, and each adjusted in the factory or laboratory to match the range of the apparatus as a whole to some particular material with which it is to be used.

Figures 7, 8 and 10 show the modified embodiment referred to earlier, it being assumed in this instance only the resistors, and not the tube 70 and coils, will require adjustment or substitution. For convenience, corresponding parts in the two embodiments will be identified by corresponding numerals.

Referring first to Figure 10, it will be seen that the circuit is exactly the same as Figure 9, excepting that only the fixed resistors of the oscillator are included within the removable unit, designated in this instance by the numeral 62a, and identified in Figure 10 by the dotted rectangle. Referring again to Figures 7 and 8, the removable unit 62a is mounted at one end of insulation panel 61, being connectable in circuit with the oscillator by pin and socket connectors 120 and 121 of the same type as explained in connection with the earlier embodiment. This removable unit 62a again has a sheet metal housing, indicated in this instance by numeral 140, and the various resistors may be mounted on its insulation base plate 141 as indicated, it being understood that the plate 141 will have the proper connector sockets of the same type as shown in Figure 6a. The vacuum tube 70 and coil 134 may be mounted inside a second housing 142 also mounted on the panel 61, and these components will be understood to be wired up in accordance with the circuit diagram of Figure 10. Thus in the embodiment of Figures 7, 8 and 10, the removable range determining unit is reduced to the bare resistor network by which the range of the instrument is set in the factory. By equipping the instrument with a number of these removable network resistors, the instrument may be adapted to any of a corresponding number of materials of diverse characteristics.

I claim:

1. In a moisture testing instrument for granular materials, the combination of: a base frame member, a power unit mounted on said base frame member, said power unit having a vertically movable plunger, a material cap carried by said plunger, an upper frame member positioned over said cup, tie rods connecting said base frame member and said upper frame member, an electrode holder carried by and extending downwardly from said upper frame member in alinement with said cup, and being adapted to slidably receive said cup with a close working fit, an insulation block carried by the lower end of said holder, electrode means on said block adapted to contact a sample of material in said cup when said plunger is elevated, an instrument housing carried by said upper frame member, a vacuum tube oscillator mounted within said housing, said oscillator including a vacuum tube, power supply means, a meter sensitive to power output, a power output circuit connected to said electrode means, and resistor means for influencing the sensitivity of the oscillator, a quick detachable unit inside said housing carrying a portion of said oscillator including said resistor means, the members of said oscillator carried by said quick detachable unit having quick-break circuit connections with the members of the oscillator mounted in said housing separate of said removable unit.

2. In a moisture testing instrument for granular materials, the combination of: a base frame member, a power unit mounted on said base frame member, said power unit having a vertically movable plunger, a material cup carried by said plunger, an upper frame member positioned over said cup, tie rods connecting said base frame member and said upper frame member, an electrode holder carried by and extending downwardly from said upper frame member in alinement with said cup, and being adapted to slidably receive said cup with a close working fit, an insulation block carried by the lower end of said holder, electrode means on said block adapted to contact a sample of material in said cup when said plunger is elevated, an instrument housing carried by said upper frame member, a vacuum tube oscillator mounted within said housing, said oscillator including a vacuum tube, power supply means, a meter sensitive to power output, a power output circuit connected to said electrode means, and resistor means for influencing the sensitivity of the oscillator, a plug-in unit insertable inside said housing, said unit carrying a portion of said oscillator including said resistor means, and pin and socket electric connector means mounting said unit inside said housing and serving to electrically connect the oscillator members inside said removable unit with the oscillator members mounted in said housing separate of said unit.

MARVIN L. McBRAYER.

REFERENCES CITED

The following references are of record in the file of this patent:

UNITED STATES PATENTS

| Number | Name | Date |
|---|---|---|
| 1,764,410 | Legg | June 17, 1930 |
| 1,826,247 | Heppenstall | Oct. 6, 1931 |
| 2,063,840 | Fairchild et al. | Dec. 8, 1936 |
| 2,082,364 | Store | June 1, 1937 |
| 2,135,017 | Sharland | Nov. 7, 1938 |
| 2,231,035 | Stevens et al. | Feb. 11, 1941 |
| 2,271,292 | Fisher | Jan. 27, 1942 |
| 2,343,340 | Stevens | Mar. 7, 1944 |
| 2,370,658 | Hart | Mar. 6, 1945 |
| 2,439,412 | Mitchell | Apr. 13, 1948 |